United States Patent
Jones et al.

(10) Patent No.: US 12,361,041 B2
(45) Date of Patent: Jul. 15, 2025

(54) SYSTEMS AND METHODS BUILDING TIERED REQUEST-RESPONSE COMMUNICATIONS USING PROBABILITY-BASED SELECTIONS

(71) Applicant: Capital One Services, LLC, McLean, VA (US)

(72) Inventors: Patrick Jones, McLean, VA (US); Rajat Gupta, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 90 days.

(21) Appl. No.: 18/185,093

(22) Filed: Mar. 16, 2023

(65) Prior Publication Data

US 2024/0311409 A1    Sep. 19, 2024

(51) Int. Cl.
*G06F 16/335* (2019.01)
*G06F 16/3349* (2025.01)
*H04L 67/306* (2022.01)

(52) U.S. Cl.
CPC ........ *G06F 16/335* (2019.01); *G06F 16/3349* (2019.01); *H04L 67/306* (2013.01)

(58) Field of Classification Search
CPC .......................... G06F 16/335; G06F 16/3349
See application file for complete search history.

(56) References Cited

U.S. PATENT DOCUMENTS

| | | | |
|---|---|---|---|
| 6,598,039 B1* | 7/2003 | Livowsky | G06F 16/335 |
| 11,366,963 B1* | 6/2022 | Morrison | G06F 40/186 |
| 2012/0290723 A1* | 11/2012 | Manikowski | G06F 9/505 |
| | | | 709/224 |
| 2015/0293997 A1* | 10/2015 | Smith | H04L 51/52 |
| | | | 707/E17.014 |
| 2023/0334547 A1* | 10/2023 | Lagoni | G06Q 30/0641 |

* cited by examiner

*Primary Examiner* — Robert W Beausoliel, Jr.
*Assistant Examiner* — Nirav K Khakhar
(74) *Attorney, Agent, or Firm* — Foley & Lardner LLP

(57) ABSTRACT

Methods and systems building tiered request-response communications using probability-based selections. For example, the methods and systems may use machine learning and/or artificial intelligence to generate a tier of a tiered request-response communications with a subset of user input fields and/or tiers, in which the subset is dispositive for completing the tiered request-response communication.

20 Claims, 6 Drawing Sheets

SYSTEMS AND METHODS BUILDING TIERED REQUEST-RESPONSE COMMUNICATIONS USING PROBABILITY-BASED SELECTIONS

BACKGROUND

Users have transitioned away from conventional methods (e.g., mail, manual entry onto paper forms, etc.) when submitting data and/or other requests. Instead, users have moved to electronic communications. In many cases, the submitted data and/or other requests may include complicated and lengthy application processes and/or online forms typically requiring users to enter data into one or more input fields. In addition to being tedious, such data entry tasks may also be difficult for users operating mobile devices (which tend to have smaller, touch screen interfaces), and mobile devices have gained popularity for transmitting all types of communications. Furthermore, the application processes and/or online forms often require additional data that is not readily available (e.g., confidential data, information generated by third-parties, etc.) and must be received by the user in response to additional requests. To further exacerbate this problem, in many cases this additional data may require users to pay a fee, remember security credentials specific to the third party, and/or reference non-electronic documents.

A conventional way of overcoming this problem is through the storage of user data and the auto-population of this stored user data in one or more input fields. However, this approach has several drawbacks. First, identifying when data is needed is difficult as the format of a form as well as the format of the required data may differ from one application, device, and/or time period to another. Second, auto-populating data relies on storing data. While some user information may be public, oftentimes, users must enter private data, or at least data that the user wishes to remain private. Accordingly, storing user data, particularly sensitive data, raises privacy concerns. Finally, users may wish for some data to be shared with some applications, while wishing that the same data is not shared with other applications. While privacy settings may prevent some unauthorized use, even these settings may be bypassed, and thus create a security risk.

SUMMARY

In light of the technical problems cited above, systems and methods are described herein building tiered request-response communications using probability-based selections. For example, a request-response communication (or request-response communication protocol) allows computers to communicate with each other in a network by the first computer sending a request for data and the second computer responding to the request with that data. One example of such a request-response communication would be a message exchange pattern in which a requestor (e.g., a computer needing information) sends a request message to a replier system, which receives the request, processes the request (e.g., determines the needed information), and returns a message in response (e.g., provides the information). The message exchange pattern may also take the form of an online form or application in which the system determines needed information and generates a request for a user to input such information. Upon entry, the system may transmit the information back to the requesting system.

For example, as opposed to the conventional solution to the aforementioned problems that rely on storing data and auto-populating that data into user input fields, the systems and methods described herein aim to reduce the burden and tediousness of entering information through the use of tiered request-response communications. For example, the system may determine specific information that is needed (e.g., a communication requirement) and generate tiers of request-response communications. That is, as opposed to a user being required to provide all information that may be required by the request-response communication, the system makes iterative requests in which only a tier of the request-response communication is requested, received, and/or processed. By doing so, the total amount of time required to process a request as well as the time a user is required to enter information is reduced.

The systems and methods may further improve upon the conventional systems by using probability-based selections when generating a tier. For example, the system may dynamically select requests for a tier based on a probability that a received response to a respective request in that tier is dispositive to finalize the tiered request-response communication. By doing so, the system not only limits the amount of requests, but also the amount of tiers. In some embodiments, systems and methods may use artificial intelligence models to generate a tier of a tiered request-response communication with a subset of a plurality of requests and/or tiers, in which the number, order, and/or arrangement of the requests and/or tiers is based on a probability that a received response to a respective request, combination of requests, and/or submission of a specific tier is dispositive to finalize the tiered request-response communication.

In some aspects, systems and methods of building tiered request-response communications using probability-based selections are described. For example, the system may receive a request for a tiered request-response communication. The system may retrieve a request profile corresponding to a tiered request-response communication, wherein the request profile includes a request characteristic, wherein the request characteristic indicates a probability that a received response to a respective request is dispositive to finalize the tiered request-response communication. The system may determine a first communication requirement for a first tier, of a plurality of tiers, of the tiered request-response communication. The system may filter, based on the first communication requirement and the request profile, a plurality of requests for the tiered request-response communication to determine a subset of the plurality of requests for linking to one or more user input fields in the first tier of the tiered request-response communication. The system may generate for display, in a user interface of a user device, the first tier of the tiered request-response communication, wherein the first tier comprises the one or more user input fields comprising the subset of the plurality of requests.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
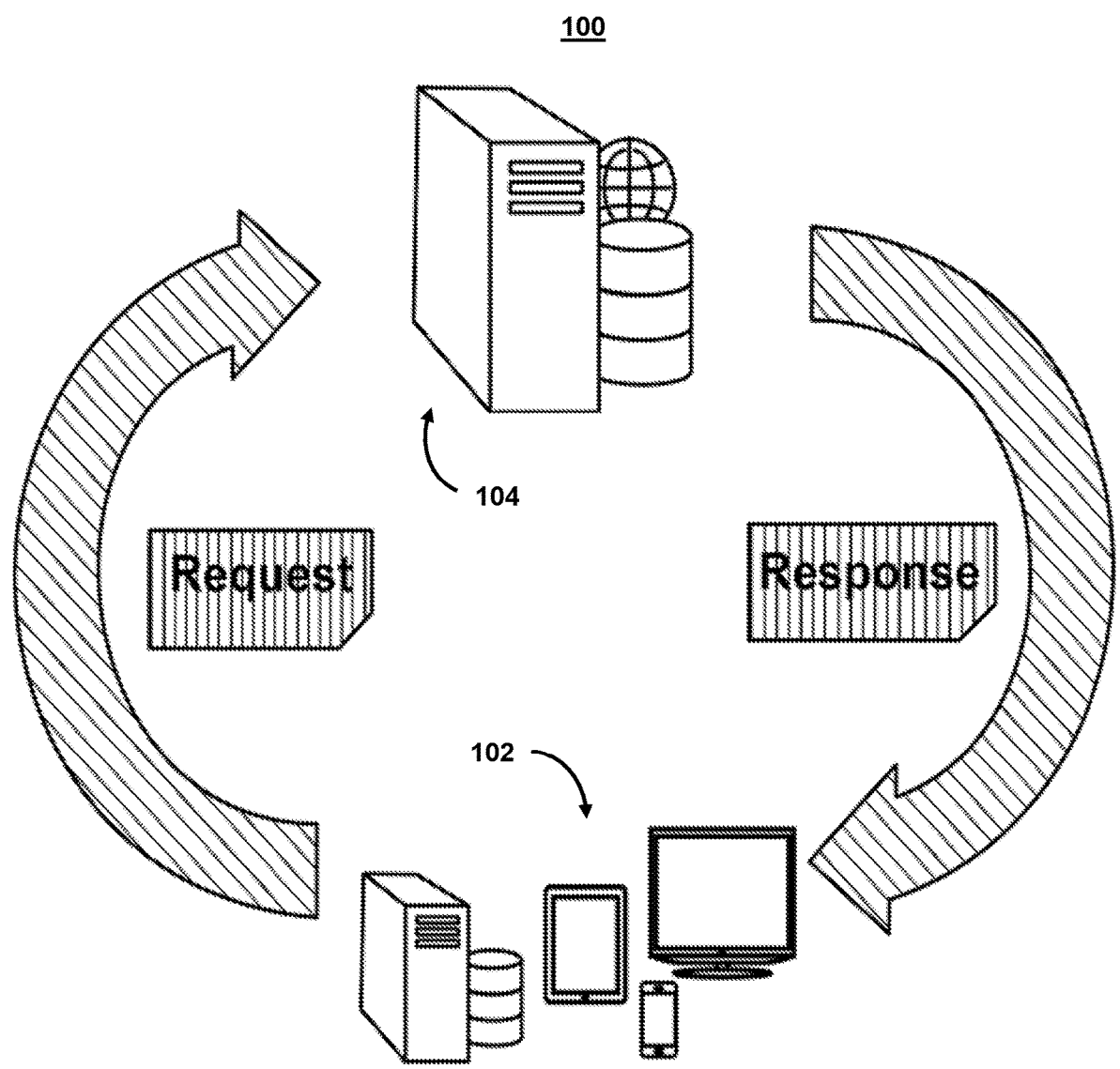
FIG. 1 shows an illustrative system environment for the exchange of requests and responses in accordance with one or more embodiments.

FIG. 1 shows an illustrative system environment for the exchange of requests and responses in accordance with one or more embodiments. For example, FIG. 1 illustrates, as described above, a request-response communication (or request-response communication protocol) that allows computers to communicate with each other in a network by the first computer sending a request for data and the second computing responding to the request with that data. One example of such a request-response communication would be a message exchange pattern in which a requestor (e.g., a computer needing information) sends a request message to a replier system, which receives the request, processes the request (e.g., determines the needed information), and returns a message in response (e.g., provides the information). The message exchange pattern may also take the form of an online form or application in which the system determines needed information and generates a request for a user to input such information. Upon entry, the system may transmit the information back to the requesting system.

For example, as shown in FIG. 1, client devices 102 may issue requests to server 104. In response, server 104 may issue responses. In some embodiments, the requests and responses may be HTTP ("Hypertext Transfer Protocol") requests and responses. HTTP is an application-layer protocol for transmitting hypermedia documents, such as HyperText Markup Language ("HTML"). Client devices 102 and server 104 may operate in a client-server model in which a distributed application structure partitions tasks or workloads between the providers of a resource or service, called servers, and service requesters, called clients.

As further shown in FIG. 1, server 104 may feature a REST architecture. For example, the REST architecture defines a set of constraints for how the architecture of an internet-scale distributed hypermedia system, such as the Web, should behave. The REST architectural style may improve (e.g., over conventional architecture) the scalability of interactions between components, uniform interfaces, independent deployment of components, and the creation of a layered architecture to facilitate caching components to reduce user-perceived latency, enforce security, and encapsulate legacy systems. REST has been employed throughout the software industry and is a widely accepted set of guidelines for creating stateless, reliable web services.

For example, server 104, based on the REST architecture, may restrict the ways that the server can process and respond to client requests so that, by operating within these constraints, the system gains desirable non-functional properties, such as performance, scalability, simplicity, modifiability, visibility, portability, and reliability. A message or request (e.g., a REST call) generally consists of an HTTP verb, which defines what kind of operation to perform, and a header, which allows the client to pass along information about the request.

In many instances, RESTful APIs are stateless (e.g., calls may be processed independently of one another, and each call contains all of the data necessary to complete itself successfully). A RESTful API should not rely on data being stored on the server or in sessions to determine what to do with a call, but rather should solely rely on the data that is provided in that call itself. As such, a representative system file may be created based on a REST call that includes the necessary information for processing and/or determining why a REST call failed. For example, each REST call has the necessary data in itself, such as the API key, access token, user ID, etc. For example, as described below, in some embodiments, the system may generate a representative system file based on a REST call.

In some embodiments, server 104 may need to maintain a 100 percent response rate to REST calls. For example, server 104 may be required by either governmental, regulatory, or client demands to ensure that all REST calls are responded to. In some embodiments, the system may be implemented in a purely synchronous fashion, as in web service calls over HTTP, which holds a connection open and waits until the response is delivered or the timeout period expires. However, request-response may also be implemented asynchronously, with a response being returned at some unknown later time. The system may determine to use asynchronous communications where slow aggregations, time-intensive functions, or human data entry must be performed before a response can be constructed and delivered.

Figure 2A:
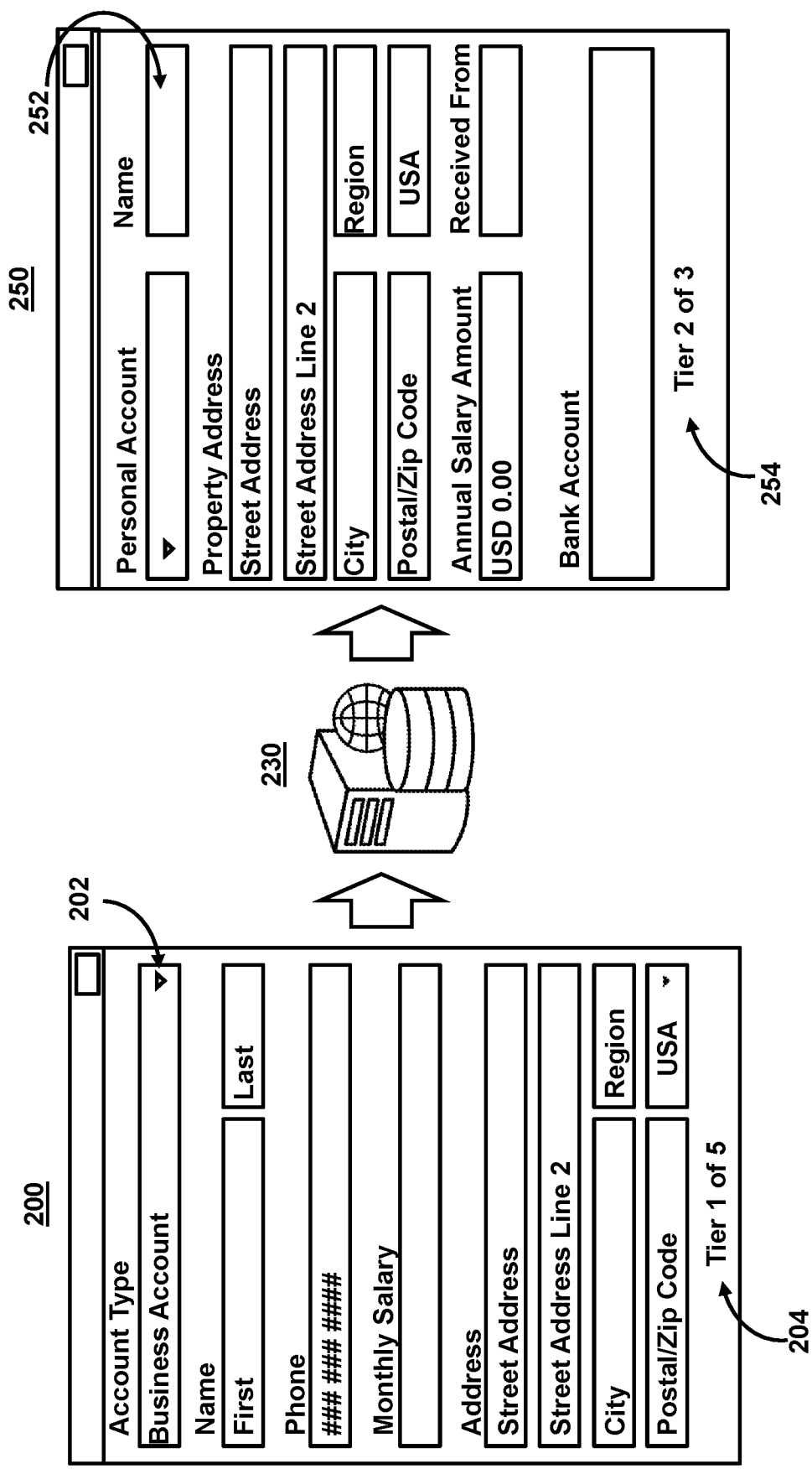
FIG. 2A shows an illustrative user interface for presenting request-response communications, in accordance with one or more embodiments.

FIG. 2A shows an illustrative user interface for presenting request-response communications, in accordance with one or more embodiments. For example, FIG. 2 shows user interface 200 and user interface 250. The system (e.g., a mobile application) may generate and respond to user interactions in a user interface (e.g., user interface 200) in order to build tiered request-response communications.

As referred to herein, a "user interface" may comprise a human-computer interaction and communication in a device, and may include display screens, keyboards, a mouse, and the appearance of a desktop. For example, a user interface may comprise a way a user interacts with an application or website. As referred to herein, "content" should be understood to mean an electronically consumable user asset, such as television programming, as well as pay-per-view programs, on-demand programs (as in video-on-demand (VOD) systems), internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance.

The system may generate a tier of a tiered request-response communication based on a first communication requirement. A first communication requirement may be the one or more requirements or criteria for which a tier of a tiered request-response communication requires information. In some embodiments, the communication requirement for a tier may correspond to the communication requirement for the tiered request-response communication itself. Alternatively or additionally, the system may determine individual communication requirements for each tier.

The communication requirement may comprise a quantitative or qualitative metric regarding the outcome of a determination, completion of a tiered request-response communication, and/or a finalization of a determination based on the tiered request-response communication. In some embodiments, this may comprise one or more requests of information about a user that needs to be received. In some embodiments, this may require the receipt of one or more values of a given request. In some embodiments, this may require a certain percentage of information and/or a certain number of a plurality of requests of information.

In some embodiments, content may be personalized for a user based on the original content and user preferences (e.g., as stored in an account profile). An account profile may be a directory of stored user settings, preferences, and information for the related user account. For example, an account profile may have the settings for the user's installed programs and operating system. In some embodiments, the account profile may be a visual display of personal data associated with a specific user, or a customized desktop environment. In some embodiments, the account profile may be a digital representation of a person's identity. The data in the account profile may be generated based on the system actively or passively monitoring.

For example, the account profile may include personal information about a user that is accumulated from one or more sources. For example, the system may retrieve a first additional account profile corresponding to the user account from a third party microservice. The system may retrieve a second additional account profile corresponding to the user account from a website cookie. The system may aggregate information from the account profile, the first additional account profile, and the second additional account profile. The system may use the account information to satisfy a communication requirement. Furthermore, the system may gather this information using one or more tiers in the tiered request-response communication.

User interface 200 includes content having a plurality of requests (e.g., request 202 and request 204). As referred to herein, a "request" may comprise any of the more or less distinct parts into which the content may be divided, or from which the content is made up. For example, a request may be distinguished from another request by one or more request characteristics. In user interface 200, the system may identify a request of the plurality of requests as having a request characteristic. The request characteristic may correspond to a request corresponding to a communication requirement.

A request characteristic may comprise any characteristic that distinguishes one request from another. For example, a request characteristic may be media-related information (e.g., ordering, heading information, titles, descriptions, ratings information (e.g., parental control ratings, critic's ratings, etc.), source code data (e.g., HTML, source code headers, etc.), genre or request information, subject matter information, author/actor information, logo data, or other identifiers for the content provider), media format, file type, object type, objects appearing in the content (e.g., product placements, advertisements, keywords, context), or any other suitable information used to distinguish one request from another. In some embodiments, the request characteristic may also be human-readable text. The request characteristic may be determined to be indicative of the request being of interest to the user based on a comparison of the request characteristic and account profile data for the user.

For example, user interface 200 may include request 202. The system may identify request 202 based on a paragraph, request break, and/or an HTML tag. The system may parse the request for a content characteristic and metadata describing the content characteristic, wherein the metadata indicates the context of the content characteristic, and wherein the content characteristic comprises human-readable text. For example, as shown in user interface 200, the system may identify a content characteristic. As referred to herein, a "content characteristic" may comprise any of the more or less distinct parts into which the request may be divided, or from which the request is made up. For example, a content characteristic can be anything that may distinguish one content characteristic from another. In some embodiments, content characteristic may be human-readable text. For example, the content characteristic may be a keyword, an image, an embedded object and/or other graphical characteristics.

The system may also generate a tier comprised of a plurality of requests (e.g., tier 204). The system may determine a number, shape, size, or other graphical characteristics for each tier. For example, each tier (e.g., tier 204) may include one or more tier characteristics. As referred to herein, a tier characteristic may include any characteristic that distinguishes one tier from another. For example, the tier characteristic may include the look or feel of a tier, a number of user input fields, a size, font, space between fields, etc.

Additionally, the system may generate a content map for the request based on the parsing, wherein the content map indicates a position of the request. For example, the content map may include each location of a given request with the distances and/or positions indicated. For example, the system may determine a CSS ("cascading style scripts") position property for each characteristic. In another example, the system may use HTML absolute positioning to define a content map. The system may then apply the content map to a tier to generate the request-response communication. The system may repeat this process for each tier. Additionally or alternatively, the system may repeat this process as user input is received, and/or a user input field and/or tier is completed. For example, upon each input, completed tier, etc., the system may transmit a request to server 130. Server 230 may then generate a new tier (or series of tiers), each with determining requests for generation. For example, as shown in FIG. 2, based on information entering into user interface 200, the system has generated user interface 250. User interface 250 includes request 252 and tier 254, which have been selected and/or organized based on the previous user inputs.

The system may then generate a feature input based on the content map, requests, and/or other metadata, wherein the feature input comprises a vector array of values indicative of the content map, requests, and/or other metadata. For example, the system may use a generative adversarial network, wherein the generative adversarial network is trained to generate outputs of alternative requests (e.g., request 252), wherein the alternative requests correspond to content maps and have request characteristics at predetermined positions.

User interface 250 includes content having a plurality of requests similar to user interface 200. In user interface 200, the system may replace a request from the original content (e.g., request 202) with another request (e.g., request 252). For example, as described below, the system may replace a request of the original content with an alternative request. For example, the system may (as described below) input the feature input into a generative adversarial network, wherein the generative adversarial network is trained to generate an output of an alternative request (e.g., request 202), wherein the alternative request corresponds to the content map, and has a request characteristic at the position. For example, alternative request 252 may correspond to request 202). User interface 200 also shows additional alternative request 202, which is a request not included in the original content. Alternative request 202 may be located at a point outside the original content map, but the system may be anchored to alternative request 202. In some embodiments, the system may generate for display alternative request 252, as well as additional alternative requests (e.g., in tier 254).

Figure 2B:
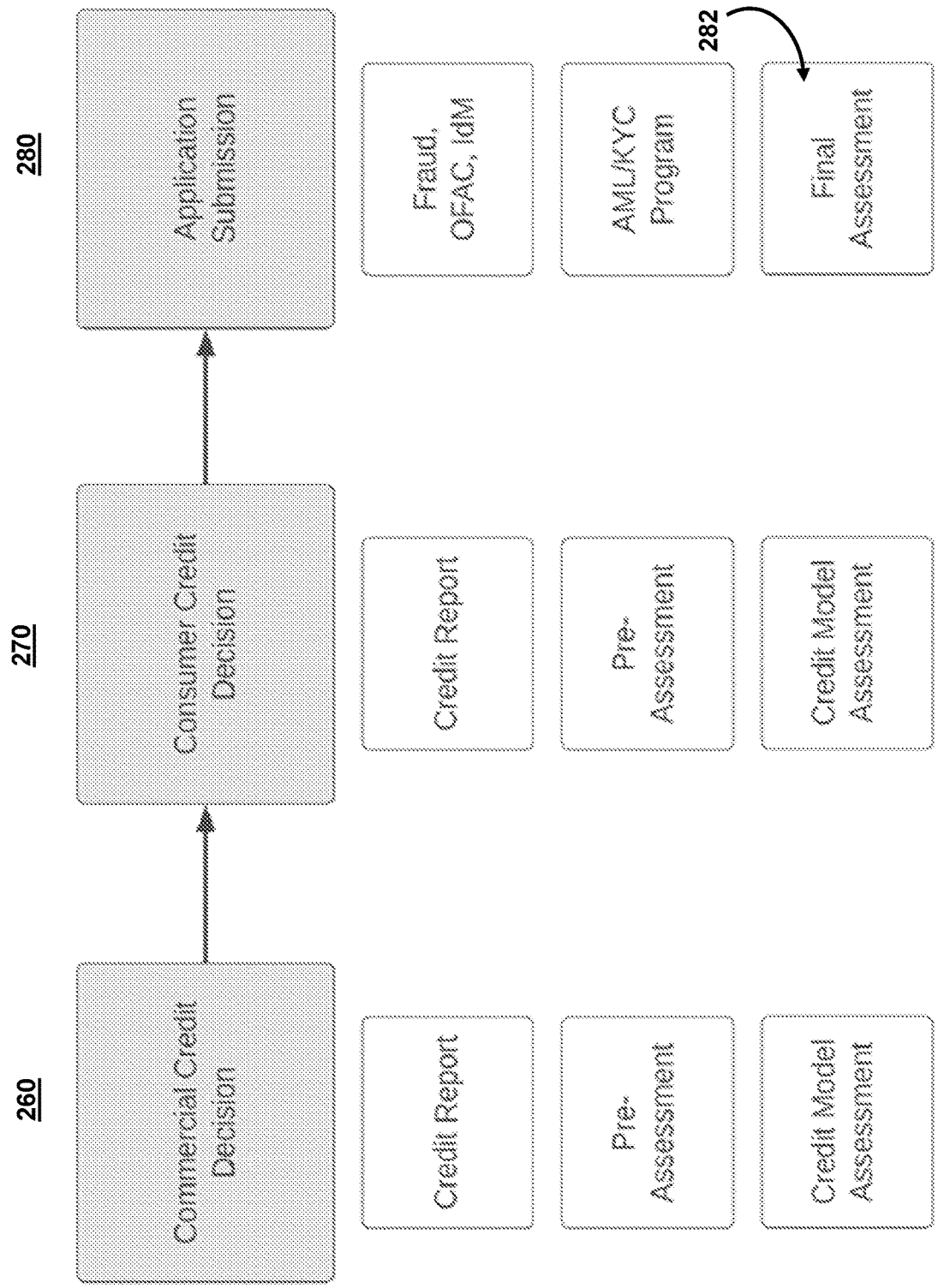
FIG. 2B shows an illustrative example of a tiered request-response communication, in some embodiments.

FIG. 2B shows an illustrative example of a tiered request-response communication, in some embodiments. For example, in some embodiments, the system may provide an iterative application process in which the applicant (e.g., user) progresses through the application. The system may attempt to make a final decision, determination, and/or completion of the application. For example, the system may be using the tiered request-response communication to make a credit decision as more information is input. As shown in FIG. 2B, the system may generate tiers, which may appear to a user in a user interface similar to user interface 200 (FIG. 2A) and user interface 250 (FIG. 2A).

Each tier may gather different information that may be dispositive to finalize the tiered request-response communication (e.g., make a decision on the credit decision). As shown in FIG. 2B, the tiers of the tiered request-response communication comprise tier 260, tier 270, and tier 280. As such, the system may receive, process, and/or make a determination with respect to the tiered request-response communication at three distinct decision points within the application process (e.g., a Commercial Credit Decision at tier 260, a Consumer Credit Decision at tier 270, and/or an application submission and final decisioning at tier 280).

Each tier may request different information and/or information in a different category. For example, the system may make separate commercial and consumer decisions (and/or a decision on commercial and/or personal information). As such, a commercial applicant may be processed without consumer details until the system determines that it cannot approve credit on commercial data alone (e.g., following a determination after processing data in tier 260).

For example, as the applicant provides information, the system sequentially processes that data in an attempt to make a determination (e.g., a credit decision). At tier 260, the system collects business information used in calling the credit bureaus to return data on the applicant's creditworthiness. Upon receiving a response, the system attempts to make a credit decision (Approve or Decline) on this commercial credit information alone.

The system may also process data in a response using models and/or data specific to the tier. For example, the system may process data received from tier 260 requests using logic-based creditworthiness models (e.g., based on commercial bankruptcies) and/or model-based creditworthiness (e.g., based on proprietary data science models). If the applicant is approved at this tier, the system may not send additional requests and/or ask for additional information. If the applicant is deemed too risky due to logic, or model-based creditworthiness, the system may decline the application (e.g., issue a final determination on the tiered request-response communication) and ask for no further information. If the applicant can neither be approved nor disapproved, the system may generate tier 270.

Tier 270 may provide additional questions (e.g., related to providing a personal guarantee). For example, if the applicant cannot be approved on commercial credit alone, the system may then attempt to collect information on a personal guarantor. For example, the system may attempt to make a credit decision (Approve or Decline) based on the combined commercial/consumer credit information (e.g., information determined in tier 260 and/or tier 270).

The system may also process data in response to tier 270 using models and/or data specific to the tier. For example, the system may process data received from tier 270 requests using logic-based creditworthiness models (e.g., based on commercial bankruptcies) and/or model-based creditworthiness (e.g., based on proprietary data science models). If the applicant is approved or referred at tier 270, the system may push them into the final submission process at tier 280 to render a final determination (e.g., determination 282). If the applicant is deemed too risky due to logic- or model-based creditworthiness, the system may decline the applicant outright and ask for no further information.

At tier 280, the system may process data in a response to tier 280 using models and/or data specific to the tier. For example, the system may process data received from tier 280 requests using logic-based creditworthiness models (e.g., based on commercial bankruptcies) and/or model-based creditworthiness (e.g., based on proprietary data science models). However, the system may also invoke more processor intensive methods. For example, the system may collect the remaining information required to fully process the application. This may include confidential and/or difficult to obtain data. This includes, but is not limited to, Initial Credit Line data, AML ("Anti Money Laundering")/KYC ("Know-Your-Customer") data, and Identity Management data. When the applicant provides these details, the system may apply the AML/KYC program along with other key processes. The applicant will proceed to final decisioning and account for the decisions made during the first two API calls (Commercial and Consumer tiers).

At each tier, the system may use probability-based selections to determine what requests are used. For example, the system may retrieve a request profile. The request profile may also include one or more request characteristics. As referred to herein, a "request characteristic" may include any characteristic that indicates a probability that a received response to the corresponding request is dispositive to finalize the tiered request-response communication. For example, the request characteristic may indicate an average number of user input fields and/or an average number of tiers of the tiered request-response communication that are typically required to make a determination for a given request-response communication. In another example, the request characteristic may indicate an average number of user input fields and/or an average number of tiers of the tiered request-response communication that is required to be dispositive. In another example, the request characteristic may indicate a maximum number of user input fields and/or a maximum number of tiers of the tiered request-response communication that may be used. For example, the system may use a request characteristic to determine an optimal number of requests (and/or user input fields) and/or tiers that will result in completing the tiered request-response communication. For example, the system may generate a tier of a tiered request-response communication comprising the subset of the plurality of requests for each user.

In some embodiments, the system may also make probability-based selections based on information about a user and/or user account. The system may retrieve this information from an account profile. The account profile may also include an account characteristic. As referred to herein, an "account characteristic" may include any characteristic that indicates the status of one or more requests of a user account. For example, the account characteristic may include a value and/or presence of a value that may correspond to, or weigh on, a value corresponding to a communication requirement for a tier of a tiered request-response communication. For example, the system may parse account characteristics (or values in an account profile that may correspond to an account characteristic) to meet one or more first communication requirement. The system may then use this information to adjust the number of requests and/or number of tiers of the tiered request-response communication. For example, if a communication has twenty different requirements, and ten may be satisfied by account characteristics from an account profile, the system may only generate ten requests (e.g., corresponding to the unsatisfied requirements).

The system may also use request and/or account characteristics to determine an order of user input fields (or an order of requests corresponding to user input fields). For example, the system may determine that one or more requests of request and/or account characteristics are available from the account profile. Additionally or alternatively, the system may determine that the presence of these request and/or account characteristics indicate that the user likely has (or does not have) other characteristics. The system may then select requests and/or tiers of the request-response communication to prioritize receiving information about these other characteristics. For example, if a communication requirement requires a user to have current employment, but the account profile indicates that there is no current employer (or there is no current income), the system may prioritize verifying this information first (e.g., by generating a corresponding request first).

Figure 3:
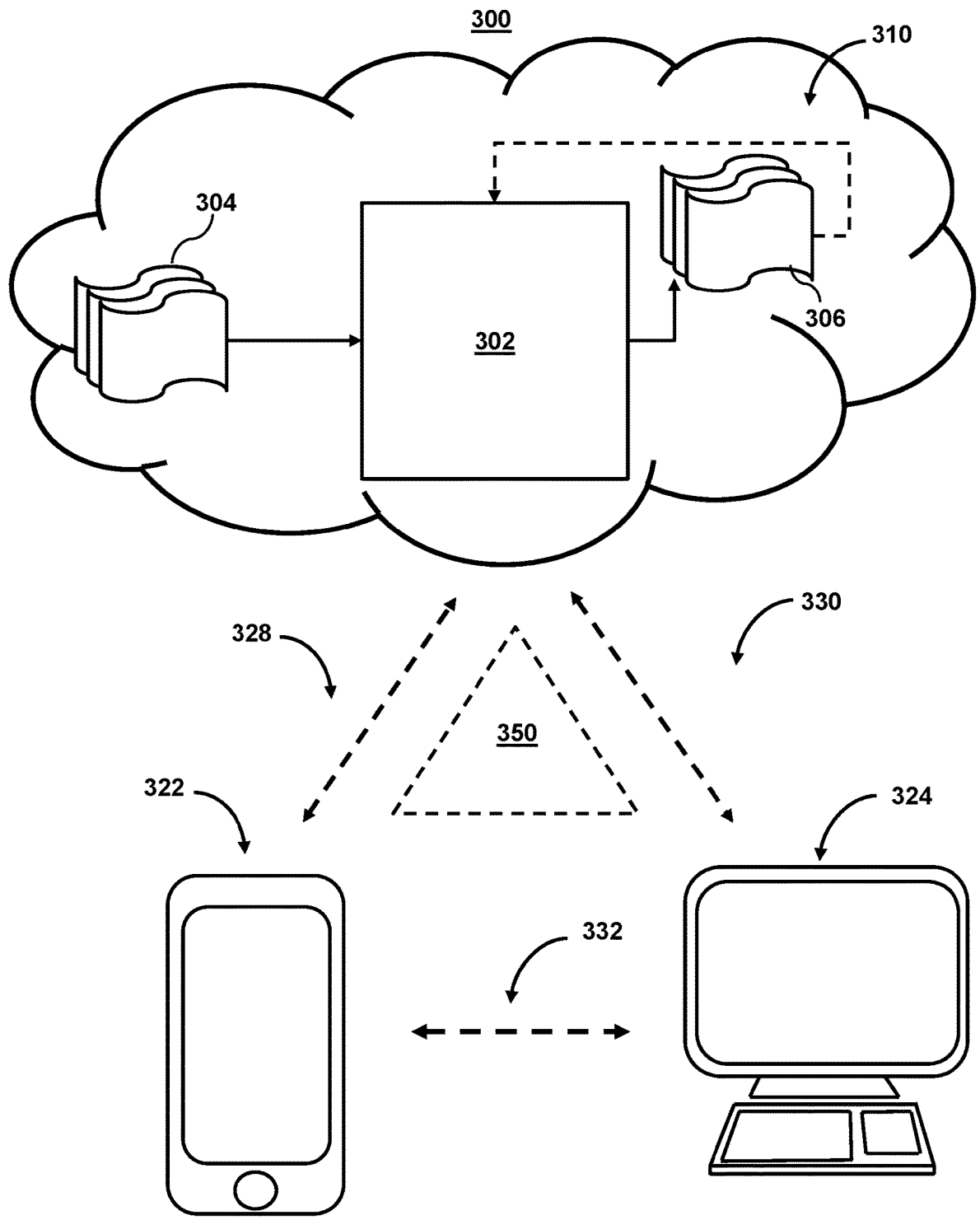
FIG. 3 shows illustrative system components building tiered request-response communications using probability-based selections, in accordance with one or more embodiments.

FIG. 3 shows illustrative system components building tiered request-response communications using probability-based selections, in accordance with one or more embodiments. As shown in FIG. 3, system 300 may include user device 322 and user terminal 324. While shown as a smartphone and personal computer, respectively, in FIG. 3, it should be noted that user device 322 and user terminal 324 may be any computing device, including, but not limited to, a laptop computer, a tablet computer, a hand-held computer, other computing equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of user device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of user device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both user device 322 and user terminal 324 include a display upon which to display data (e.g., conversational responses, queries, and/or notifications).

Additionally, as user device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device, such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating responses, queries, and/or notifications. Alternatively, or additionally, the system may act as a clearing house for multiple sources of information about the user. This information may be compiled into an account profile. Cloud components 310 may also include control circuitry configured to perform the various operations needed to generate requests. For example, the cloud components 310 may include cloud-based storage circuitry configured to generate requests. Cloud components 310 may also include cloud-based control circuitry configured to run processes to determine requests. Cloud components 310 may also include cloud-based input/output circuitry configured to display requests.

Cloud components 310 may include model 302, which may be an artificial intelligence model. Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first artificial intelligence model to classify the first labeled feature input with the known prediction.

In another embodiment, model 302 may update its configurations (e.g., weights, biases, or other parameters) based on the assessment of its prediction (e.g., outputs 306) and reference feedback information (e.g., user indication of accuracy, reference labels, or other information). In another embodiment, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., back-propagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back-propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a probability of a determination based on a response).

In some embodiments, model 302 may predict a request. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions on a user's account. The output of the model (e.g., model 302) is only used to decide dynamically select requests.

System 300 also includes API layer 350. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract called WSDL that describes the services in terms of their operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layers and Back-End Layers, where microservices reside. In this kind of architecture, the role of the API layer 350 may be to provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
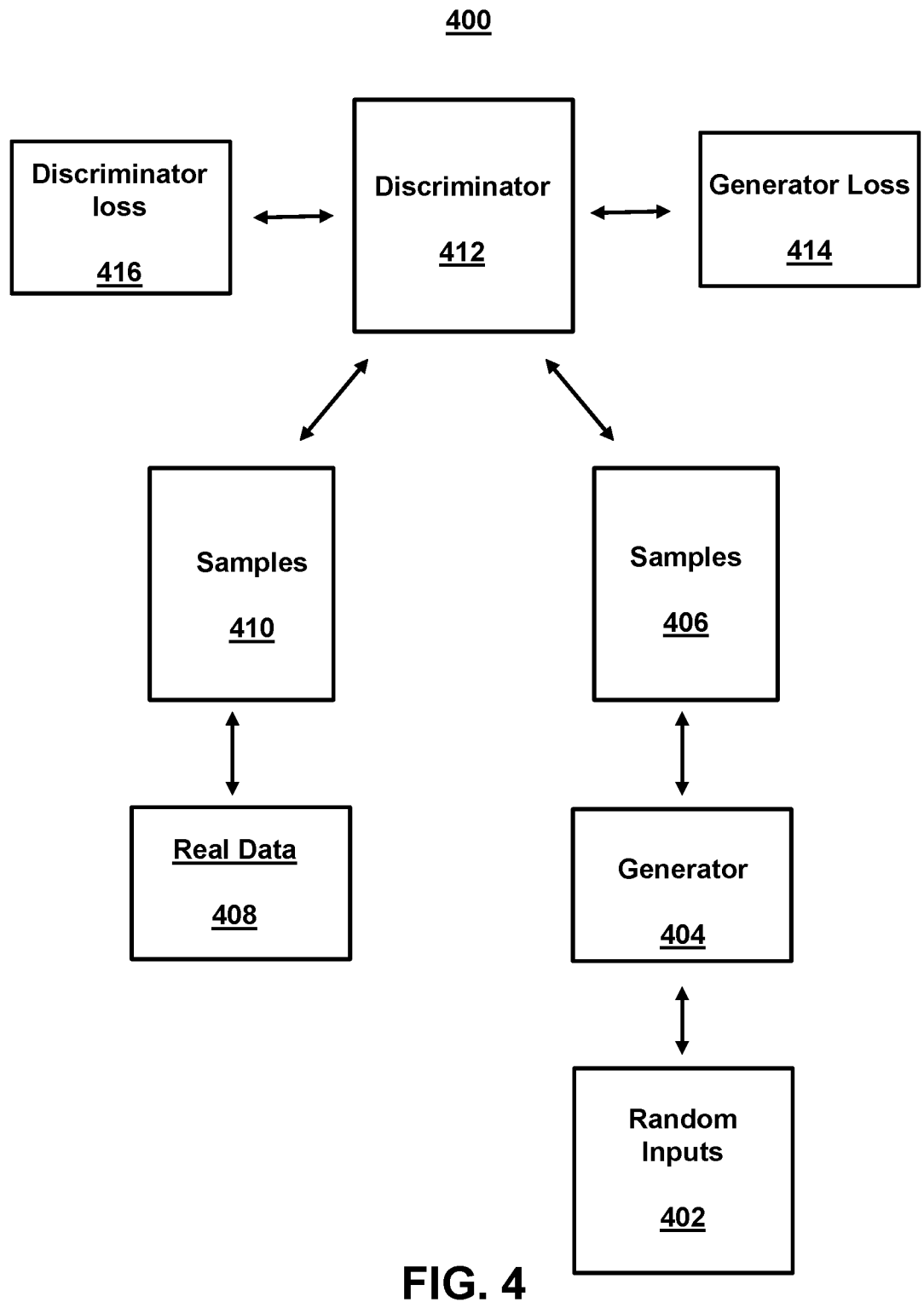
FIG. 4 shows illustrative model architecture for an artificial intelligence model used to build tiered request-response communications, in accordance with one or more embodiments.

FIG. 4 shows illustrative model architecture for an artificial intelligence model used to build tiered request-response communications, in accordance with one or more embodiments. The system may be trained to generate the subset of user input fields and/or the preferred number of tiers of the tiered request-response communication. For example, the artificial intelligence model is trained to: determine the requests, of the plurality of requests, required to be populated to meet the first communication requirement; filter the plurality of requests based on whether any of the plurality of requests is populated by known account characteristics for user accounts retrieved from account profiles; and determine for the filtered plurality of requests a number of user input fields and a number of tiers of the tiered request-response communication based on known request characteristics for user accounts retrieved from account profiles.

For example, FIG. 4 comprises system 400. System 400 may be used to generate requests and/or tiers using generative adversarial networks implemented in an application programming interface layer. System 400, which may comprise a generative adversarial network, may include various requests and/or tiers. For example, system 400 may include random inputs 402, which are fed into generator 404 to generate samples 406. Similarly, real data 408 may generate samples 410. Samples 406 and samples 410 may be fed into discriminator 412. Outputs from discriminator 412 may include discriminator loss 416 and generator loss 414.

For example, in system 400, both generator 404 and discriminator 412 may be neural networks. Generator 404 outputs may be connected directly to an input for discriminator 412. Through back-propagation, a classification from discriminator 412 provides a signal that generator 404 uses to update its weights. The back-propagation may comprise fine-tuning the weights used by system 400 (and/or generator 404 or discriminator 412) based on the error rate obtained in the previous epoch (i.e., iteration). Proper tuning of the weights allows system 400 to reduce error rates.

For example, generator 404 may generate new data instances. Discriminator 412 discriminates between different kinds of data instances. A generative adversarial network is a type of generative model. For example, given a set of data instances X and a set of labels Y, generator 404 may capture the joint probability $p(X, Y)$, or just $p(X)$ if there are no labels, whereas discriminator 412 captures the conditional probability $p(Y|X)$.

Discriminator 412 may be a classifier that distinguishes real data (e.g., samples 410) from the data created by generator 404 (e.g., samples 406). For example, discriminator 412 may use samples 410 as positive examples during training. Discriminator 412 may use samples 410 as negative examples during training. In system 400, discriminator 412 connects to two loss functions (e.g., discriminator loss 416 and generator loss 414). During discriminator 412 training, discriminator 412 ignores generator loss 414, and uses discriminator loss 416.

During discriminator 412 training, discriminator 412 classifies both real data and fake data from generator 404. Discriminator loss 216 penalizes discriminator 212 for misclassifying a real instance (e.g., samples 210) as fake, or a fake instance (e.g., samples 206) as real. Discriminator 212 updates its weights through back-propagation from discriminator loss 216 through the discriminator network. Generator 404 of system 400 learns to create fake data by incorporating feedback from discriminator 412 (e.g., it learns to make discriminator 412 classify its output as real). In some embodiments, generator 404 training requires tighter integration between generator 404 and discriminator 412 than discriminator training requires. For example, system 400 trains generator 404 using random inputs 402.

As generator 404 improves with training, discriminator 412's performance gets worse because discriminator 412 cannot easily tell a difference between samples 410 and samples 406. If generator 404 succeeds, then discriminator 412 may have a 50% accuracy. Accordingly, generator 404 attempts to maximize generator loss 414.

System 400 provides significant advantages over conventional machine learning. Specifically, the system may process both text and image data. First, system 400 includes architecture and training strategy that enables compelling text to image synthesis. For example, system 400 may train on a subset of training requests (e.g., subsets within samples 406 and 410), wherein the subsets are linked to specific characteristics (e.g., section and/or content). For example, system 400 consists of generator 404 and discriminator 412 that compete in a two player minimax game for each subset of training requests. For example, for each subset, discriminator 412 tries to distinguish real training data for each subset (e.g., samples 410) from synthetic data for each subset (e.g., samples 406), and generator 404 tries to fool discriminator 412. For example, system 400 may include text encoders/decoders and image encoders/decoders for each subset.

System 400 may be trained on subset features encoded by a hybrid character-level convolutional recurrent neural network. Both generator 404 and discriminator 412 perform feed-forward inferences conditioned on the subset feature. In system 400, discriminator 412 observes two kinds of inputs: real images with matching text, and synthetic images with arbitrary text. System 400 implicitly separates two sources of error: unrealistic images (for any text), and realistic images of the wrong class that mismatch the conditioning information. System 400 separates these error sources. For example, in addition to the real/fake inputs to discriminator 412 during training, system 400 adds a third type of input consisting of real images with mismatched text, which discriminator 412 learns to score as fake. By learning to optimize image/text matching in addition to the image realism, discriminator 412 provides an additional signal to the generator.

It should be noted that additionally or alternatively, the system may use variational autoencoders to generate content. For example, a variational autoencoder provides a probabilistic manner for describing an observation in latent space. As such, instead of using an encoder which outputs a single value to describe each latent state attribute, the system may determine a probability distribution for each latent attribute. To describe the observation in a probabilistic manner, the system determines a probability distribution for each latent attribute. During decoding from the latent state, the system randomly samples from each latent state distribution to generate a vector as input for the decoder. Accordingly, the variational autoencoder provides a model that outputs a range of possible values (e.g., a statistical distribution). These values can then be randomly sampled by the decoder. This creates a continuous, smooth latent space representation in which values that are nearby to one another in latent space create similar reconstructions.

Figure 5:
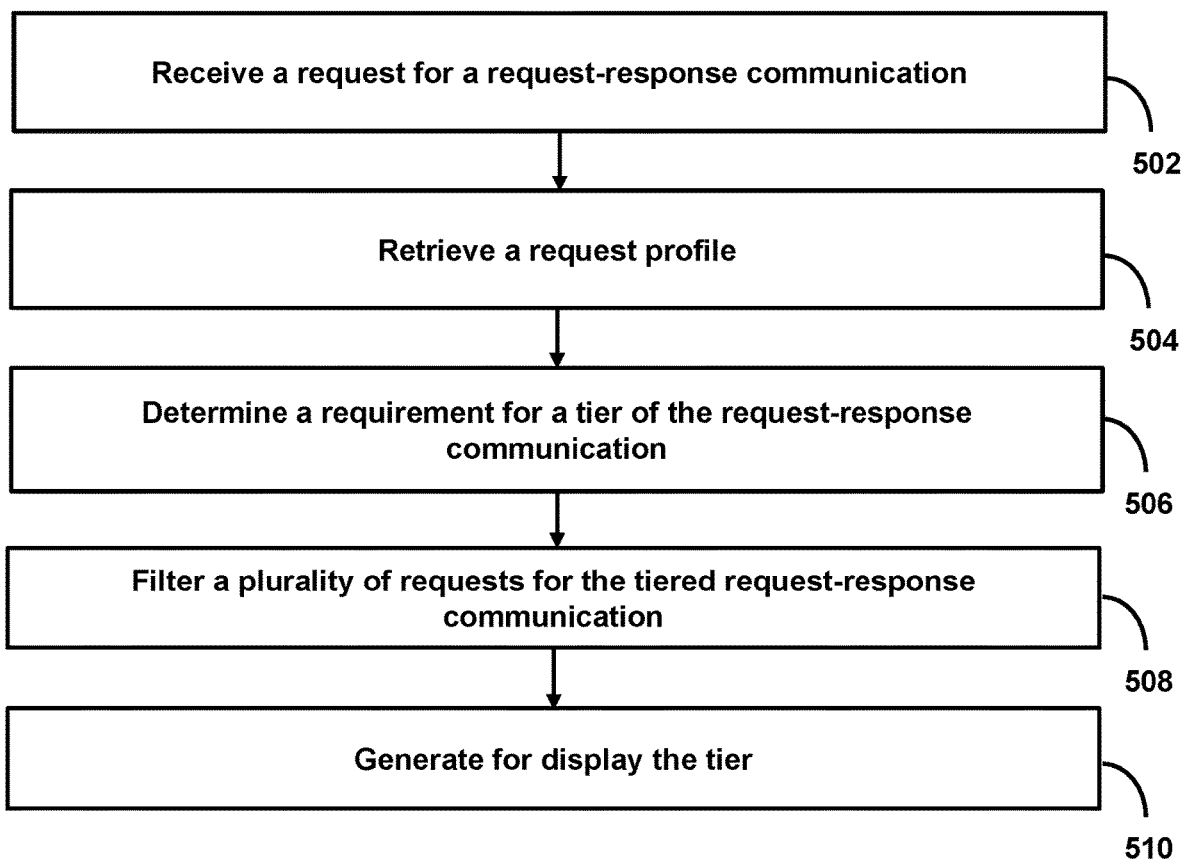
FIG. 5 shows a flowchart of the steps involved in using artificial intelligence models to build tiered request-response communications, in accordance with one or more embodiments.

FIG. 5 shows a flowchart of the steps involved in using artificial intelligence models to build tiered request-response communications, in accordance with one or more embodiments. For example, the system may use process 500 (e.g., as implemented on one or more system components) in order to build tiered request-response communications.

At step 502, process 500 (e.g., using one or more components described in system 300 (FIG. 3)) receives a request for a tiered request-response communication. For example, the system may receive the request from a user (e.g., a user accessing a website or portal that requires a user to fill out an online form). Alternatively, the request may be received from a server and/or be sent automatically. For example, the request may be generated by the server in response to the user accessing the website or the portal that requires the user to fill out the online form.

At step 504, process 500 (e.g., using one or more components described in system 300 (FIG. 3)) retrieves a request profile. For example, the system may retrieve a request profile corresponding to a tiered request-response communication, wherein the request profile includes a request characteristic, wherein the request characteristic indicates a probability that a received response to a respective request is dispositive to finalize the tiered request-response communication. For example, the request profile may comprise a plurality of request characteristics corresponding to respective requests. The system may use the request characteristics to determine what request to populate in a given tier of the communication.

At step 506, process 500 (e.g., using one or more components described in system 300 (FIG. 3)) determines first communication requirement. For example, the system may determine a first communication requirement for a tier of a tiered request-response communication.

At step 508, process 500 (e.g., using one or more components described in system 300 (FIG. 3)) filters a plurality of requests for the tiered request-response communication. For example, the system may filter, based on the first communication requirement and the request profile, a plurality of requests for the tiered request-response communication to determine a subset of the plurality of requests for linking to one or more user input fields in the first tier of the tiered request-response communication.

In some embodiments, the system may also filter the plurality of requests based on information that is already known about a user account. For example, if the system determines that some information is known, the system may bypass to generate a request for that information. For example, the system may retrieve an account profile corresponding to a user account, wherein the account profile includes an account characteristic, wherein the account characteristic indicates a current status of information in the user account corresponding to a respective request. The system may then further filter the plurality of requests based on whether any of the plurality of requests is populated by known account characteristics for user accounts retrieved from account profiles. In some embodiments, the system may receive multiple account profiles and/or aggregate information from multiple profiles together. For example, the system may retrieve a first additional account profile corresponding to the user account from a third party microservice. The system may retrieve a second additional account profile corresponding to the user account from a website cookie. The system may aggregate information from the account profile, the first additional account profile, and the second additional account profile.

In some embodiments, the system may use an artificial intelligence model to perform the filtering. For example, the system may generate a first feature input based on the request profile and the first communication requirement. For example, the feature input may be a vectorized array of data. The artificial intelligence model (which may comprise a generative adversarial network) may be trained to: determine the requests, of the plurality of requests, required to be populated to meet the first communication requirement; filter the plurality of requests based on whether any of the plurality of requests is populated by known account characteristics for user accounts retrieved from account profiles; and determine for the filtered plurality of requests a number of user input fields and a number of tiers of the tiered request-response communication based on known request characteristics for user accounts retrieved from account profiles.

For example, the artificial intelligence model may be trained to determine a first request of the plurality of requests at which a determination on the tiered request-response communication has the predetermined probability of being final, and filter the plurality of requests based on the first request. Additionally or alternatively, the artificial intelligence model is further trained to determine respective probabilities of various orders of input fields at which a determination on the tiered request-response communication has the predetermined probability of being final, wherein the first output indicates a preferred order of user input fields, and wherein the a tier of a tiered request-response communication comprises the subset of the plurality of requests based on the respective probabilities of the various orders. Additionally or alternatively, the artificial intelligence model is further trained to determine respective probabilities of various orders of tiers at which a determination on the tiered request-response communication has the predetermined probability of being final, wherein the first output indicates a preferred order of tiers, and wherein a tier of a tiered request-response communication comprises the subset of the plurality of requests in the preferred order of tiers. The system may receive from the artificial intelligence model a first output wherein the first output indicates, based on the first feature input, a subset of user input fields for a tier of the tiered request-response communication.

In some embodiments, the system may determine the number of user input fields and the number of tiers of the tiered request-response communication based on known request characteristics for user accounts retrieved from account profiles. For example, the system may determine the number of user input fields and the number of tiers of the tiered request-response communication with a predetermined probability of being dispositive to finalize the tiered request-response communication.

For example, when determining the number of user input fields and the number of tiers of the tiered request-response communication with the predetermined probability of being dispositive to finalize the tiered request-response communication, the system may determine a first number of user input fields at which a determination on the tiered request-response communication has the predetermined probability of being final. The system may then determine a first number of tiers of the tiered request-response communication at which a dispositive determination is reached for the tiered request-response communications. The system may then determine the subset of the plurality of requests based on the first number of user input fields of the first tier.

In some embodiments, when determining a first number of user input fields at which a determination on the tiered request-response communication has the predetermined probability of being final, the system may determine a first number of tiers of the tiered request-response communication at which a dispositive determination is reached for the tiered request-response communications. The system may then determine the subset of the plurality of requests based on the first number of user input fields of the first tier.

For example, when determining the number of user input fields and the number of tiers of the tiered request-response communication with the predetermined probability of being dispositive to finalize the tiered request-response communication, the system may determine a respective probability corresponding to each number of user input fields at which a determination on the tiered request-response communication has the predetermined probability of being final. The system may determine a respective probability corresponding to each number of tiers of the tiered request-response communication at which a determination on the tiered request-response communication has the predetermined probability of being final. The system may determine the subset of the plurality of requests based on the respective probability corresponding to each number of user input fields and the respective probability corresponding to each number of tiers of the tiered request-response communication.

In some embodiments, the system may continuously update the requests and/or tiers as a user inputs data and completes a user input field and/or tier. For example, the system may receive a user input into the tier of a tiered request-response communication. The system may generate a second feature input based on the user input, the account profile, or the first communication requirement. The system may input the second feature input into the artificial intelligence model. The system may receive from the artificial intelligence model a second output. The system may update the tier of a tiered request-response communication based on the second output (e.g., the system may generate user interface 150 (FIG. 1)).

At step 510, process 500 (e.g., using one or more components described in system 300 (FIG. 3)) generates the tier for display. For example, the system may generate for display, in a user interface of a user device, the first tier of the tier request-response communication, wherein the first tier comprises the one or more user input fields comprising the subset of the plurality of requests.

In some embodiments, the system may continue to use artificial intelligence models to build tiered request-response communications each time a user completes an input into a field or finishes a tier. For example, the system may receive a user input into the tier of a tiered request-response communication. The system may generate a second feature input based on the user input, the account profile, or the first communication requirement. The system may then input the second feature input into the artificial intelligence model. The system may receive from the artificial intelligence model a second output. The system may then update a tier of a tiered request-response communication based on the second output.

It is should be noted that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for building tiered request-response communications using probability-based selections.
2. The method of the preceding embodiment, the method comprising: receiving a request for a tiered request-response communication; retrieving a request profile corresponding to a tiered request-response communication, wherein the request profile includes a request characteristic, wherein the request characteristic indicates a probability that a received response to a respective request is dispositive to finalize the tiered request-response communication; determining a first communication requirement for a first tier, of a plurality of tiers, of the tiered request-response communication; filtering, based on the first communication requirement and the request profile, a plurality of requests for the tiered request-response communication to determine a subset of the plurality of requests for linking to one or more user input fields in the first tier of the tiered request-response communication; and generating for display, in a user interface of a user device, the first tier of the tier request-response communication, wherein the first tier comprises the one or more user input fields comprising the subset of the plurality of requests.

3. The method of any one of the preceding embodiments, wherein filtering, based on the first communication requirement and the request profile, the plurality of requests for the tiered request-response communication further comprises: generating a first feature input based on the request profile and the first communication requirement; and inputting the first feature input into an artificial intelligence model, wherein the artificial intelligence model is trained to determine the requests, of the plurality of requests, required to be populated to meet the first communication requirement.

4. The method of any one of the preceding embodiments, further comprising: receiving a user input into the first tier; generating a second feature input based on the user input, the request profile, and the first communication requirement; inputting the second feature input into the artificial intelligence model; receiving from the artificial intelligence model a second output; and generating for display, in the user interface of the user device, a second tier of the tier request-response communication based on the second output.

5. The method of any one of the preceding embodiments, wherein filtering, based on the first communication requirement and the request profile, the plurality of requests for the tiered request-response communication further comprises: retrieving an account profile corresponding to a user account, wherein the account profile includes an account characteristic, wherein the account characteristic indicates a current status of information in the user account corresponding to a respective request; and further filtering the plurality of requests based on whether any of the plurality of requests is populated by known account characteristics for user accounts retrieved from account profiles.

6. The method of any one of the preceding embodiments, further comprising: retrieving a first additional account profile corresponding to the user account from a third party microservice; retrieving a second additional account profile corresponding to the user account from a website cookie; and aggregating information from the account profile, the first additional account profile, and the second additional account profile.

7. The method of any one of the preceding embodiments, wherein determining the subset of the plurality of requests further comprises determining a number of user input fields or a number of tiers of the tiered request-response communication with a predetermined probability of being dispositive to finalize the tiered request-response communication.

8. The method of any one of the preceding embodiments, wherein determining the number of user input fields or the number of tiers of the tiered request-response communication with the predetermined probability of being dispositive to finalize the tiered request-response communication comprises: determining a first number of user input fields at which a determination on the tiered request-response communication has the predetermined probability of being final; and determining the subset of the plurality of requests based on the first number of user input fields of the first tier.

9. The method of any one of the preceding embodiments, wherein determining the first number of user input fields at which the determination on the tiered request-response communication has the predetermined probability of being final further comprises: determining a respective probability corresponding to each number of user input fields at which the determination on the tiered request-response communication has the predetermined probability of being final; and determining the subset of the plurality of requests based on the respective probability corresponding to each number of user input fields.

10. The method of any one of the preceding embodiments, wherein determining the number of user input fields or the number of tiers of the tiered request-response communication with the predetermined probability of being dispositive to finalize the tiered request-response communication comprises: determining a first number of tiers of the tiered request-response communication at which the tiered request-response communication has the predetermined probability of being final; and determining the subset of the plurality of requests based on the first number of tiers of the tiered request-response communication.

11. The method of any one of the preceding embodiments, wherein determining the first number of tiers of the tiered request-response communication at which the tiered request-response communication has the predetermined probability of being final further comprises: determining a respective probability corresponding to each number of tiers of the tiered request-response communication at which the determination on the tiered request-response communication has the predetermined probability of being final; and determining the subset of the plurality of requests based on the respective probability corresponding to each number of tiers of the tiered request-response communication.

12. The method of any one of the preceding embodiments, wherein determining the subset of the plurality of requests further comprises: determining a first request of the plurality of requests at which a determination on the tiered request-response communication has a predetermined probability of being final; and filtering the plurality of requests based on the first request.

13. The method of any one of the preceding embodiments, wherein determining the subset of the plurality of requests further comprises: determining respective probabilities of various orders of input fields at which a determination on the tiered request-response communication has a predetermined probability of being final, wherein the first output indicates a preferred order of user input fields; and selecting an order of the subset of the plurality of requests based on the respective probabilities of the various orders.

14. The method of any one of the preceding embodiments, wherein determining the subset of the plurality of requests further comprises: determining respective probabilities of various orders of tiers at which a determination on the tiered request-response communication has the predetermined probability of being final; and selecting an order of the tiers of the tiered request-response communication based on the respective probabilities of the various orders.

15. A tangible, non-transitory, machine-readable medium storing instructions that, when executed by a data processing apparatus, cause the data processing apparatus to perform operations comprising those of any of embodiments 1-14.

16. A system comprising: one or more processors; and memory storing instructions that, when executed by the processors, cause the processors to effectuate operations comprising those of any of embodiments 1-14.

17. A system comprising means for performing any of embodiments 1-14.

What is claimed is:

1. A system for building tiered request-response communications for communication across computer networks using probability-based selections, the system comprising:
one or more processors; and
a non-transitory, computer-readable medium comprising instructions that when executed on the one or more processors cause operations comprising:
receiving, from a first device in a computer network, a communication request for a determination on a communication, wherein the determination on the communication is based on one or more account characteristics for a first user account of a first user; and
in response to receiving the communication request, generating, at a second device in the computer network, a tiered request-response communication by:
retrieving a request profile corresponding to a plurality of requests for the tiered request-response communication, wherein the request profile includes a plurality of request characteristics, wherein each request characteristic of the plurality of request characteristics corresponds to a respective request of the plurality of requests, wherein each request characteristic indicates a probability that a response to the respective request is dispositive to complete the determination on the communication, wherein the probability is based on a previous tiered request-response communication for a second user account of a second user, wherein the previous tiered request-response communication is of a same type as the tiered request-response communication;
filtering, based on the probability for each request characteristic, the plurality of requests for the tiered request-response communication to determine a first subset of the plurality of requests, wherein a first probability of a first request characteristic of a first request of the first subset is greater than a second probability of a second request characteristic of a second request not included in the first subset;
filtering the first subset based on whether any request of the first subset corresponds to an account characteristic of the first user account to generate a second subset for linking to one or more user input fields in a first tier of the tiered request-response communication; and
generating for display, via a user interface, the first tier of the tiered request-response communication based on the second subset of the plurality of requests.

2. A method for building tiered request-response communications for communication across computer networks using probability-based selections, the method comprising:
receiving a request for a tiered request-response communication for a first user account of a first user;
retrieving a request profile corresponding to a plurality of requests for the tiered request-response communication, wherein the request profile includes a plurality of request characteristics, wherein each request characteristic of the plurality of request characteristics corresponds to a respective request of the plurality of requests, wherein each request characteristic indicates a probability that a response to the respective request is dispositive to complete a determination on the tiered request-response communication, wherein the probability is based on a previous tiered request-response communication for a second user account of a second user, wherein the previous tiered request-response communication is of a same type as the tiered request-response communication;
determining a first communication requirement for a first tier, of a plurality of tiers, of the tiered request-response communication;
filtering, based on the probability for each request characteristic and the first communication requirement, the plurality of requests for the tiered request-response communication to determine a subset of the plurality of requests for linking to one or more user input fields in the first tier of the tiered request-response communication, wherein a first probability of a first request characteristic of a first request of the subset is greater than a second probability of a second request characteristic of a second request not included in the subset; and
generating for display, in a user interface of a user device, the first tier of the tiered request-response communication, wherein the first tier comprises the one or more user input fields comprising the subset of the plurality of requests.

3. The method of claim 2, wherein filtering, based on the first communication requirement and the request profile, the plurality of requests for the tiered request-response communication further comprises:
generating a first feature input based on the request profile and the first communication requirement; and
inputting the first feature input into an artificial intelligence model, wherein the artificial intelligence model is trained to determine requests, of the plurality of requests, required to be populated to meet the first communication requirement.

4. The method of claim 3, further comprising:
receiving a user input into the first tier;
generating a second feature input based on the user input, the request profile, and the first communication requirement;
inputting the second feature input into the artificial intelligence model;
receiving from the artificial intelligence model a second output; and
generating for display, in the user interface of the user device, a second tier of the tiered request-response communication based on the second output.

5. The method of claim 2, wherein filtering, based on the first communication requirement and the request profile, the plurality of requests for the tiered request-response communication further comprises:
retrieving an account profile corresponding to the first user account, wherein the account profile includes an account characteristic, wherein the account characteristic indicates a current status of information in the first user account corresponding to a respective request; and
further filtering the plurality of requests based on whether any of the plurality of requests is populated by known account characteristics for user accounts retrieved from account profiles.

6. The method of claim 5, further comprising:
retrieving a first additional account profile corresponding to the first user account from a third party microservice;
retrieving a second additional account profile corresponding to the first user account from a website cookie; and aggregating information from the account profile, the first additional account profile, and the second additional account profile.

7. The method of claim 2, wherein determining the subset of the plurality of requests further comprises determining a number of user input fields or a number of tiers of the tiered request-response communication with a predetermined probability of being dispositive to finalize the tiered request-response communication.

8. The method of claim 7, wherein determining the number of user input fields or the number of tiers of the tiered request-response communication with the predetermined probability of being dispositive to finalize the tiered request-response communication comprises:
determining a first number of user input fields at which the determination on the tiered request-response communication has the predetermined probability of being final; and
determining the subset of the plurality of requests based on the first number of user input fields of the first tier.

9. The method of claim 8, wherein determining the first number of user input fields at which the determination on the tiered request-response communication has the predetermined probability of being final further comprises:
determining a respective probability corresponding to each number of user input fields at which the determination on the tiered request-response communication has the predetermined probability of being final; and
determining the subset of the plurality of requests based on the respective probability corresponding to each number of user input fields.

10. The method of claim 7, wherein determining the number of user input fields or the number of tiers of the tiered request-response communication with the predetermined probability of being dispositive to finalize the tiered request-response communication comprises:
determining a first number of tiers of the tiered request-response communication at which the tiered request-response communication has the predetermined probability of being final; and
determining the subset of the plurality of requests based on the first number of tiers of the tiered request-response communication.

11. The method of claim 10, wherein determining the first number of tiers of the tiered request-response communication at which the tiered request-response communication has the predetermined probability of being final further comprises:
determining a respective probability corresponding to each number of tiers of the tiered request-response communication at which the determination on the tiered request-response communication has the predetermined probability of being final; and
determining the subset of the plurality of requests based on the respective probability corresponding to each number of tiers of the tiered request-response communication.

12. The method of claim 2, wherein determining the subset of the plurality of requests further comprises:
determining a third request of the plurality of requests at which the determination on the tiered request-response communication has a predetermined probability of being final; and
filtering the plurality of requests based on the third request.

13. The method of claim 2, wherein determining the subset of the plurality of requests further comprises:

determining respective probabilities of various orders of input fields at which the determination on the tiered request-response communication has a predetermined probability of being final; and
selecting an order of the subset of the plurality of requests based on the respective probabilities of the various orders.

14. The method of claim 2, wherein determining the subset of the plurality of requests further comprises:
determining respective probabilities of various orders of tiers at which the determination on the tiered request-response communication has a predetermined probability of being final; and
selecting an order of the tiers of the tiered request-response communication based on the respective probabilities of the various orders.

15. A non-transitory, computer readable medium comprising instructions that when executed on one or more processors cause operations comprising:
receiving a request for a tiered request-response communication for a first user account of a first user;
retrieving a request profile corresponding to a plurality of requests for the tiered request-response communication, wherein the request profile includes a plurality of request characteristics, wherein each request characteristic of the plurality of request characteristics corresponds to a respective request of the plurality of requests, wherein each request characteristic indicates a probability that a response to the respective request is dispositive to complete a determination on the tiered request-response communication, wherein the probability is based on a previous tiered request-response communication for a second user account of a second user, wherein the previous tiered request-response communication is of a same type as the tiered request-response communication;
determining a first communication requirement for a first tier, of a plurality of tiers, of the tiered request-response communication;
filtering, based on the probability for each request characteristic and the first communication requirement, the plurality of requests for the tiered request-response communication to determine a subset of the plurality of requests for linking to one or more user input fields in the first tier of the tiered request-response communication, wherein a first probability of a first request characteristic of a first request of the subset is greater than a second probability of a second request characteristic of a second request not included in the subset; and
generating for display, in a user interface of a user device, the first tier of the tiered request-response communication, wherein the first tier comprises the one or more user input fields comprising the subset of the plurality of requests.

16. The non-transitory, computer readable medium of claim 15, wherein filtering, based on the first communication requirement and the request profile, the plurality of requests for the tiered request-response communication further comprises:
generating a first feature input based on the request profile and the first communication requirement; and
inputting the first feature input into an artificial intelligence model, wherein the artificial intelligence model is trained to determine requests, of the plurality of requests, required to be populated to meet the first communication requirement.

17. The non-transitory, computer readable medium of claim 16, further comprising:
- receiving a user input into the first tier;
- generating a second feature input based on the user input, the request profile, and the first communication requirement;
- inputting the second feature input into the artificial intelligence model;
- receiving from the artificial intelligence model a second output; and
- generating for display, in the user interface of the user device, a second tier of the tiered request-response communication based on the second output.

18. The non-transitory, computer readable medium of claim 15, wherein filtering, based on the first communication requirement and the request profile, the plurality of requests for the tiered request-response communication further comprises:
- retrieving an account profile corresponding to the first user account, wherein the account profile includes a plurality of account characteristics, wherein each account characteristic of the plurality of account characteristics indicates a current status of information in the first user account corresponding to a respective request; and
- further filtering the plurality of requests based on whether any of the plurality of requests is populated by known account characteristics for user accounts retrieved from account profiles.

19. The non-transitory, computer readable medium of claim 15, wherein determining the subset of the plurality of requests further comprises determining a number of user input fields or a number of tiers of the tiered request-response communication with a predetermined probability of being dispositive to finalize the tiered request-response communication.

20. The non-transitory, computer readable medium of claim 19, wherein determining the number of user input fields or the number of tiers of the tiered request-response communication with the predetermined probability of being dispositive to finalize the tiered request-response communication comprises:
- determining a first number of user input fields at which the determination on the tiered request-response communication has the predetermined probability of being final; and
- determining the subset of the plurality of requests based on the first number of user input fields of the first tier.

* * * * *